United States Patent [19]

Shimokawa et al.

[11] Patent Number: 5,248,746
[45] Date of Patent: Sep. 28, 1993

[54] METHOD OF PRODUCING POLYMERS

[75] Inventors: Yoshiharu Shimokawa; Yasuo Tsunogae; Shin-ichiro Tahara; Masami Kitaoka, all of Yokohama; Yoshitsugu Hirokawa, Kamakura, all of Japan

[73] Assignee: Nippon Zeon Co., Ltd., Tokyo, Japan

[21] Appl. No.: 679,193

[22] Filed: Apr. 2, 1991

[30] Foreign Application Priority Data

Apr. 3, 1990 [JP] Japan ..................................... 2-88951

[51] Int. Cl.$^5$ .............................................. C08F 4/16
[52] U.S. Cl. .................... 526/145; 526/193; 526/209; 526/216; 526/348.7
[58] Field of Search ............... 526/145, 193, 216, 209, 526/348.7

[56] References Cited

U.S. PATENT DOCUMENTS 3,641,188  2/1972  Yoo .
4,276,394  1/1981  Kennedy ............................ 525/245
4,719,271  1/1988  Dietz ................................. 526/114

FOREIGN PATENT DOCUMENTS 0341012  11/1989  European Pat. Off. .

OTHER PUBLICATIONS

*The Donor-Acceptor Approach to Molecular Interactions,* by Viktor Gutman, Plenum Press, New York, 1978, pp. 19–27.

*Primary Examiner*—Joseph L. Schofer
*Assistant Examiner*—R. H. Delmendo
*Attorney, Agent, or Firm*—Sherman and Shalloway

[57] ABSTRACT

A method of producing a polymer of a cationically polymerizable vinyl monomer by polymerizing at least one cationically polymerizable vinyl monomer using a polymerization initiator system composed of an organic compound having a functional group represented by formula (I) below

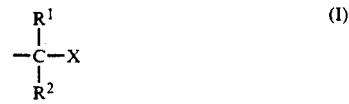

where $R^1$ represents a hydrogen atom, an alkyl group, or an aryl group; $R^2$ represents an alkyl group, or an aryl group; X represents a halogen atom, an alkoxy group, or an acyloxy group, and a Lewis acid, wherein polymerization is carried out in the presence of a phosphorus-containing compound selected from the group consisting of a phosphine, a phosphine oxide, a phosphite, and a phosphate.

4 Claims, No Drawings

METHOD OF PRODUCING POLYMERS

BACKGROUND OF THE INVENTION

1. Field of the Invention

The present invention relates to a method of producing polymers of a cationically polymerizable vinyl monomer by an improved cation polymerization. More particularly, the present invention relates to a method of producing polymers, block copolymers, terminal-functional polymers, or macromonomers whose molecular weight distribution is narrow so that the molecular weight can freely be controlled over a wide range from a low molecular weight to a high molecular weight, and whose terminal structure is also controlled freely, by cation polymerization at a controlled reaction rate.

2. Description of the Prior Arts

Generally, when cation polymerization of cationically polymerizable vinyl monomers, chain transfer reaction or chain termination occurs readily because carbenium ion which is a propagation species is unstable, and therefore it has been heretofore difficult to freely control the molecular weight of polymers and obtain polymers having narrow molecular weight distributions.

With respect to the control of the molecular weight of polymers, there are some reports on examples where attempts were made to increase the molecular weight. For example, DE 2057953 and DE 2110682 disclose that upon cation polymerization of isobutylene using a proton donating compound such as an alcohol and a Lewis acid, polymers with higher molecular weights can be obtained in the presence of compounds such as amides, esters, or pyridines in the polymerization system. However, it is difficult even in this system to control the molecular weight of the resulting polymer and obtain polymers having narrow molecular weight distributions. Moreover, the polymerization reaction is over within several tens seconds, resulting in that it is in effect impossible to fully remove heat of polymerization.

U.S. Pat. Nos. 3,994,993 and 4,276,394 describe trials for the synthesis of block copolymers. The methods disclosed therein are disadvantageous in that not only block copolymers but also respective homopolymers of comonomers used are formed in unnegligible amounts and as a result fractionation operations are required, and polymerization process is complicated.

Living polymerization, which does not cause transfer reaction or termination reaction, is easy to control the molecular weight of the resulting polymer, thus making it possible to synthesize block copolymers, to give polymers having narrow molecular weight distributions, and to control polymerization rates. Various attempts have been made in order to find a living polymerization system for cation polymerization.

Recently, there has been some reports on examples of a so-called living cation polymerization which is cation polymerization of a type in which isomerization reaction, chain transfer reaction, and termination reaction of a propagating carbenium ion are inhibited. For example, Higashimura, et al., *Macromolecules*, 17, 265 (1984) reported that cation living polymerization is possible in the polymerization of vinyl ether using a combination of hydrogen iodide and iodine as an initiator. However, this method has various problems, for example, that application of the polymerization with this initiator is limited to polymerization of monomers having an alkoxyl group which is highly electron donating and thus having a high cation polymerizability, and the initiator used is unstable and is difficult to handle.

On the other hand, Kennedy, et al., EP 206756 and EP 265053 have demonstrated that cation living polymerization is possible for olefin monomers by polymerizing an olefin monomer such as isobutylene using a combination of an organic carboxylic acid, ester or ether and a Lewis acid. However, this method have many problems which must be cleared before it can be used on an industrial scale.

Kennedy, et al. have used boron trichloride which has a weak polymerization activity as the Lewis acid preferentially. This is presumably because the use of a Lewis acid having a strong polymerization activity gives rise to various side reactions, which makes it difficult to control the molecular weight of the resulting polymer In fact, when use is made of titanium tetrachloride, which has a strong polymerization activity, it is difficult to control the molecular weight and polymerization rate. Generally, in cation polymerization, polymerization rate is greatly influenced by dissociation state of ion pairs of propagation species; polymerization rate decreases by the use of nonpolar solvents such as butane and pentane in which ion pairs do not dissociate. Therefore, when boron trichloride, which has a weak polymerization activity, is used as the Lewis acid, polymerization does not proceed until polar solvents such as methyl chloride are used as the solvent.

Polar solvents, which give favorable results in the method of Kennedy, et al., are a poor solvent for polyisobutylene which is produced, the polymer separates out in the system when its molecular weight reaches 5,000 or more, and the reactivity of propagation active species decreases extremely. Hence, in order to obtain high polymers with controlled molecular weights, polymerization must be carried out at extremely high rates so that the polymerization is completed before a polymer separates out. On this occasion, however, a large amount of heat is generated in a short time. Further, it is impossible to obtain block copolymers by adding monomers in succession because the polymer which are formed separate out in poor solvents.

U.S. Pat. No. 4,870,144 describes living cation polymerization performed in a mixed solvent. This method suffers from similar problems to those encountered in the method of Kennedy, et al. described above, and is not qualified as a method for the production of polymers in which the control of molecular weight is easy.

SUMMARY OF THE INVENTION

An object of the present invention is to provide a method of producing a polymer of a cationically polymerizable vinyl monomer which enables the control of the molecular weight of the resulting polymer over a wide range and also enables the control of the terminal structure of the polymer, and which can produce high polymers having high molecular weights at desired polymerization rates.

As a result of extensive investigation, the present inventors have found that the above-described object can be achieved by polymerizing a cationically polymerizable vinyl monomer using a polymerization initiator system composed of an organic compound having a specified functional group and a Lewis acid in the presence of a phosphorus-containing compound selected from the group consisting of a phosphine, a phosphine oxide, a phosphite, and a phosphate (hereafter, referred to as "phosphorus-containing compound"), and they have also found that block copolymers can be synthesized by adding in succession other vinyl monomers to the polymerization solution after completion of the polymerization in the first step.

Therefore, according to the present invention, there are provided methods (1), (2) and (3) below.

(1) A method of producing a polymer of a cationically polymerizable vinyl monomer by polymerizing at least one cationically polymerizable vinyl monomer using a polymerization initiator system composed of an organic compound having a functional group represented by formula (I) below

where $R^1$ represents a hydrogen atom, an alkyl group, or an aryl group; $R^2$ represents an alkyl group, or an aryl group; X represents a halogen atom, an alkoxy group, or an acyloxy group, and a Lewis acid, wherein said polymerization is carried out in the presence of a phosphorus-containing compound selected from the group consisting of a phosphine, a phosphine oxide, a phosphite, and a phosphate.

(2) A method as described (1) above, wherein said polymer is a block copolymer.

(3) A method of producing a block copolymer as described (2) above, wherein after polymerization of one kind of cationically polymerizable vinyl monomer is substantially completed, another kind of cationically polymerizable vinyl monomer is added in succession and said polymerization is completed.

DETAILED DESCRIPTION OF THE INVENTION

The organic compound having the functional group represented by formula (I) below (hereafter, referred to as "initiator compound") is exemplified as below.

Examples of the halogen compound include 2-chloro-2-phenylpropane, bis(2-chloro-2-propyl)benzene, tris(2-chloro-2-propyl)benzene, bis(2-chloro-2-propyl)-t-butylbenzene, bis(2-chloro-2-propyl)biphenyl, bis(2-chloro-2-propyl)phenanthrene, bis(2-chloro-2-propyl)-phenylethane, bis(2-chloro-2-propyl)phenylpropane 2-chloro-2,4,4-trimethylpentane, 2,4,4,6-tetramethyl-2,6-dichloroheptane, 2,4,6-trimethyl-2,4,6-trichloroheptane, 2,4-dimethyl-2,4-dichloropentane, 2,5-dimethyl-2,5-dichlorohexane, 2,5-dimethyl-2,5-dichloro-3-hexyne 2,5,8-trimethyl-2,5,8-trichlorononane, triphenylchloromethane, 2-chloropropane, 2-chlorobutane, t-butyl chloride, 1-chloroethyl benzene, and the like.

Examples of the compound having an alkoxy group include 2-methoxy-2-phenylpropane, bis(2-methoxy-2-propyl)benzene, tris(2-methoxy-2-propyl)benzene, bis(2-methoxy-2-propyl)-t-butylbenzene, bis(2-methoxy-2-propyl)biphenyl, bis(2-methoxy-2-propyl)-phenanthren bis(2-methoxy-2-propyl)phenylethane, bis(2-methoxy-2-propyl)phenylpropane, 2,4,4-trimethyl-2-methoxypentane, 2,4,4,6-tetramethyl-2,6-dimethoxyheptane, 2,4,6-trimethyl-2,4,6-trimethoxyheptane, 2,4-dimethyl-2,4-dimethoxypentane, 2,5-dimethyl-2,5-dimethoxyhexane, 2,5-dimethyl-2,5-dimethoxy-3-hexyne, 2,5,8-trimethyl-2,5,8-trimethoxynonane, t-butyl methyl ether, sec-butyl methyl ether, isopropyl methyl ether, and the like.

Examples of the compound having an acyloxy group include 2-acetoxy-2-phenylpropane, bis(2-acetoxy-2-propyl)benzene, tris(2-acetoxy-2-propyl)benzene, bis(2-acetoxy-2-propyl)-t-butylbenzene, bis(2-acetoxy-2-propyl)biphenyl, bis(2-acetoxy-2-propyl)phenanthren bis(2-acetoxy-2-propyl)phenylethane, bis(2-acetoxy-2-propyl)phenylpropane, 2,4,4-trimethyl-2-acetoxypentane, 2,4,4,6-tetramethyl-2,6-diacetoxyheptane, 2,4,6-trimethyl-2,4,6-triacetoxyheptane, 2,4-dimethyl-2,4-diacetoxypentane, 2,5-dimethyl-2,5-diacetoxyhexane, 2,5-dimethyl-2,5-diacetoxy-3-hexyne, 2,5,8-trimethyl-2,5,8-triacetoxynonane, triphenyl methyl acetate, t-butyl acetate, sec-butyl acetate, isopropyl acetate, and the like.

Among these organic compounds (initiator compounds), particularly preferred are those containing a t-butyl group, a phenyl group or a biphenyl group.

Examples of the Lewis acid include metal halide compounds such as $BCl_3$, $BF_3$, $BF_3OEt_2$, $TiCl_4$, $SnCl_4$, $AlCl_3$, $AlRCl_2$, $AlR_2Cl$ (where R represents a lower alkyl group having 1 to 5 carbon atoms), $SbCl_5$, $SbF_5$, $WCl_5$, $MoCl_5$, and $TaCl_5$.

Examples of the phosphine include trimethyl phosphine, tripropylphosphine, tributylphosphine, tricyclohexylphosphine, triphenylphosphine, and the like.

Examples of the phosphine oxide include trimethylphosphine oxide, triethylphosphine oxide, tripropylphosphine oxide, tributylphosphine oxide, trioctylphosphine oxide, triphenylphosphine oxide, and the like.

Examples of the phosphite include trimethyl phosphite, triethyl phosphite, tripropyl phosphite, triphenyl phosphite, phenyl diisodecyl phosphite, diphenyl isodecyl phosphite, tris(nonylphenyl) phosphite, and the like.

Examples of the phosphate include trimethyl phosphate, triethyl phosphate, tripropyl phosphate, tributyl phosphate, trioctyl phosphate, triphenyl phosphate, and the like.

Examples of the cationically polymerizable vinyl monomer include isobutylene, propylene, 1-butene, 2-butene, 2-methyl-1-butene, 3-methyl-1-butene, pentene, 4-methyl-1-pentene, hexene, vinylcyclohexene, styrene, methylstyrene, t-butylstyrene, monochlorostyrene, dichlorostyrene, methoxystyrene, α-methyl-styrene, β-methylstyrene, dimethylstyrene, butadiene, isoprene, cyclopentadiene, methyl vinyl ether, methyl propenyl ether, ethyl propenyl ether, β-pinene, indene, acenaphthylene, and the like.

Amounts of the initiator compound, of the Lewis acid, of the phosphorus-containing compound, and of the vinyl monomer used are as follows. That is, the amount of the Lewis acid must be at least equimolar with respect to mole number of the functional group represented by formula (I) in the phosphorus-containing compound serving as an initiation point for polymerization (hereafter, referred to as "functional group concentration") and also equimolar with respect to mole number of the phosphorus-containig compound. Preferably, the Lewis acid is used in an amount of 1 to 100 times by mole the functional group concentration in the initiator compound. The phosphorus-containing compound is used preferably in an amount of 0.01 to 100 times by volume the functional group concentration of the initiator compound. Under the conditions where the phosphorus-containing compound is excessive to the Lewis acid, polymerization substantially stops and therefore such conditions are undesirable. The vinyl monomer is used in an amount of 5 to 10,000 times, preferably 20 to 5,000 times by mole the functional group concentration in the initiator compound. While the respective components and vinyl monomer may be added in any order, it is preferred to add the phosphorus-containing compound before the vinyl monomer is contacted with the Lewis acid.

The kind of the solvent which is used in the polymerization is not limited particularly and any solvent may be used in the polymerization so far as it gives no adverse influence on the polymerization activity of the initiator compound. Examples of the solvent which is used in the polymerization include aliphatic organic solvents such as butane, pentane, hexane, and heptane; nitro compounds such as nitromethane, and nitroethane; halogenated organic solvents; and mixtures thereof.

Polymerization temperature is not limited particularly. So long as it is $-120°$ to $50°$ C., and preferably $-100°$ to $20°$ C. Polymerization time (polymerization rate) can be controlled by the amounts of the initiator compound, Lewis acid and phosphorus-containing compound.

The molecular weight of the polymer can be controlled by the ratio of the concentration of the initiator compound to the concentration of the vinyl monomer.

Block copolymers can be prepared by performing polymerization in such a manner that after charging one kind of cationically polymerizable vinyl monomer, an initiator compound, a Lewis acid and a phosphorus-containing compound and substantially completing polymerization, another kind of cationically polymerizable vinyl monomer is added to the reaction system in succession and said polymerization is continued to completion.

As described above, according to the present invention, upon polymerization of a cationically polymerizable vinyl monomer, a polymer having a molecular weight distribution narrower than the prior art and having a controlled molecular weight and a controlled terminal structure can be prepared at a controlled polymerization rate by performing the polymerization using a polymerization initiator system composed of an organic compound having specified functional group and a Lewis acid in the presence of a phosphorus-containing compound selected from the group consisting of a phosphine, a phosphine oxide, a phosphite, and a phosphate.

Further, according to the method of the present invention, block copolymers having molecular weights controlled freely can be synthesized by polymerizing in succession at least two different cationically polymerizable vinyl monomers. The addition of a compound having a functional group which can react with propagating carbenium ions results in introduction of the functional group at terminals of the polymer.

EXAMPLES

The present invention will be explained in more detail by way of examples. In the examples and comparative examples below, all percentages (%) are by weight unless otherwise indicated specifically.

Number average molecular weight (Mn) and Mw/Mn (Mw denotes weight average molecular weight) were obtained by GPC (HLC-8020 produced by Toso). Theoretical molecular weight or M.V. calcd., that is, molecular weight to be obtained assuming that the initiator was fully active and no chain transfer reaction nor termination reaction occurred during the polymerization, was calculated according to the following formula. In the formula "conv. (%)" indicates degree of conversion of polymerization.

$$M.W. \text{ calcd.} = \frac{\text{Weight of Vinyl Monomer Charged (g)}}{\text{Amount of Initiator Compound (mol)}} \times \frac{\text{Conv. (\%)}}{100} + \text{Molecular Weight of Initiator Compound}$$

EXAMPLES 1 TO 4

In a dry nitrogen gas atmosphere, 0.56 g (10 mmol) of isobutylene, 1.5 mg (10 μmol) of 2-methoxy-2-phenylpropane (CumOMe), 30 μmol of a phosphorus compound, 4.0 ml of methylene chloride, and 4.0 ml of n-hexane were charged in a glass vessel, and cooled to $-50°$ C. Then, 1.0 ml of a solution of 0.3 mol of TiCl$_4$ (TiCl$_4$ 0.3 mmol) in a mixed solvent of methylene chloride/n-hexane (1/1 by volume) cooled to $-50°$ C. in advance was added thereto and polymerization was started. After lapse of a predetermined time, 3.0 ml of methanol was added to stop the polymerization, and the solvent was removed to obtain an objective polymer.

Polymerization time and results obtained are shown in Table 1.

TABLE 1

| Example | Electron Donating Compound | Polymerization Time (hr) | Conv. (%) | Mn (M.W.Calcd.) × 10$^{-4}$ | Mw/Mn |
|---|---|---|---|---|---|
| 1 | Triphenyl phosphine | 1 | 19 | 1.2 (1.1) | 1.09 |
|   | Triphenyl phosphine | 2 | 38 | 2.0 (2.1) | 1.16 |
|   | Triphenyl phosphine | 4 | 68 | 2.9 (3.8) | 1.16 |
|   | Triphenyl phosphine | 6 | 80 | 3.3 (4.5) | 1.19 |
| 2 | Triphenyl phosphine oxide | 1 | 26 | 1.6 (1.5) | 1.22 |
|   | Triphenyl phosphine oxide | 2 | 30 | 2.0 (1.7) | 1.10 |
|   | Triphenyl phosphine oxide | 4 | 71 | 3.0 (4.0) | 1.23 |
|   | Triphenyl phosphine oxide | 17 | 97 | 3.5 (5.4) | 1.23 |
| 3 | Triphenyl phosphate | 1 | 28 | 1.3 (1.7) | 1.21 |
|   | Triphenyl phosphate | 2 | 36 | 1.9 (2.0) | 1.11 |
|   | Triphenyl phosphate | 4 | 69 | 3.0 (3.9) | 1.16 |
|   | Triphenyl phosphate | 17 | 93 | 3.6 (5.2) | 1.22 |
| 4 | Triphenyl phosphite | 1 | 25 | 1.3 (1.4) | 1.18 |
|   | Triphenyl phosphite | 2 | 36 | 1.8 (2.0) | 1.16 |
|   | Triphenyl phosphite | 4 | 68 | 2.9 (3.8) | 1.17 |
|   | Triphenyl phosphite | 17 | 92 | 4.1 (5.2) | 1.14 |

As shown in Example 1 to 4, conv. and Mn increase, respectively, with lapse of polymerization time.

EXAMPLE 5

In a dry nitrogen gas atmosphere, 0.56 g (10 mmol) of isobutylene (IB), 1.5 mg (10 μmol) of 2-methoxy-2- phenylpropane (CumOMe), 8.6 g (30 μmol) of triphenyl phosphine oxide, 4.0 ml of methylene chloride, and 4.0 ml of n-hexane were charged in a glass vessel, and cooled to −68° C. Then, 1.0 ml of a solution of 0.3 mol of TiCl4 (TiCl4 0.3 mmol) in a mixed solvent of methylene chloride/n-hexane (1/1 by volume) cooled to −68° C. in advance was added thereto and polymerization was started. After 8 hours, 1.2 ml (5.4 mmol) of styrene (St) in 4.4 M methylene chloride/n-hexane (1/1 by volume) solution was added. After 13 hours from the addition of styrene, 5 ml of methanol was added to stop the polymerization, and the solvent was removed under reduced pressure to obtain an objective polymer. Results obtained are shown in Table 2.

TABLE 2

| Example | Polymer | Yield (g) | IB Conv. (%) | St Conv. (%) | Mn (M.W. Calcd.) × 10⁻⁴ | Mw/Mn |
|---|---|---|---|---|---|---|
| 5 | Isobutylene Homopolymer | — | 100 | — | 4.4 (5.6) | 1.12 |
|  | Block Copolymer | 0.96 | — | 71 | 5.4 (9.6) | 1.55 |

What is claimed is:

1. A method of producing a polymer of a cationically polymerizable vinyl monomer by polymerizing at least one cationically polymerizable vinyl monomer using a polymerization initiator system composed of an organic compound having a functional group represented by formula (I) below

where $R^1$ represents a hydrogen atom, an alkyl group, or an aryl group; $R^2$ represents an alkyl group, or an aryl group; X represents a halogen atom, an alkoxy group, or an acyloxy group, and a Lewis acid, wherein said polymerization is carried out in the presence of a phosphorus-containing compound selected from the group consisting of trimethyl phosphate and tributyl phosphate.

2. The method as claimed in claim 1, wherein said Lewis acid is TiCl4.

3. The method as claimed in claim 1, wherein said organic compound is a compound having a t-butyl group, a phenyl group or a biphenyl group.

4. The method as claimed in claim 1, wherein said Lewis acid and said phosphorus-containing compound are used in amounts of 1 to 100 times and 0.01 to 100 times, respectively, by mole number of said functional group represented by formula (I) above in said organic compound serving as initiation point of polymerization.

* * * * *